Patented Oct. 9, 1945

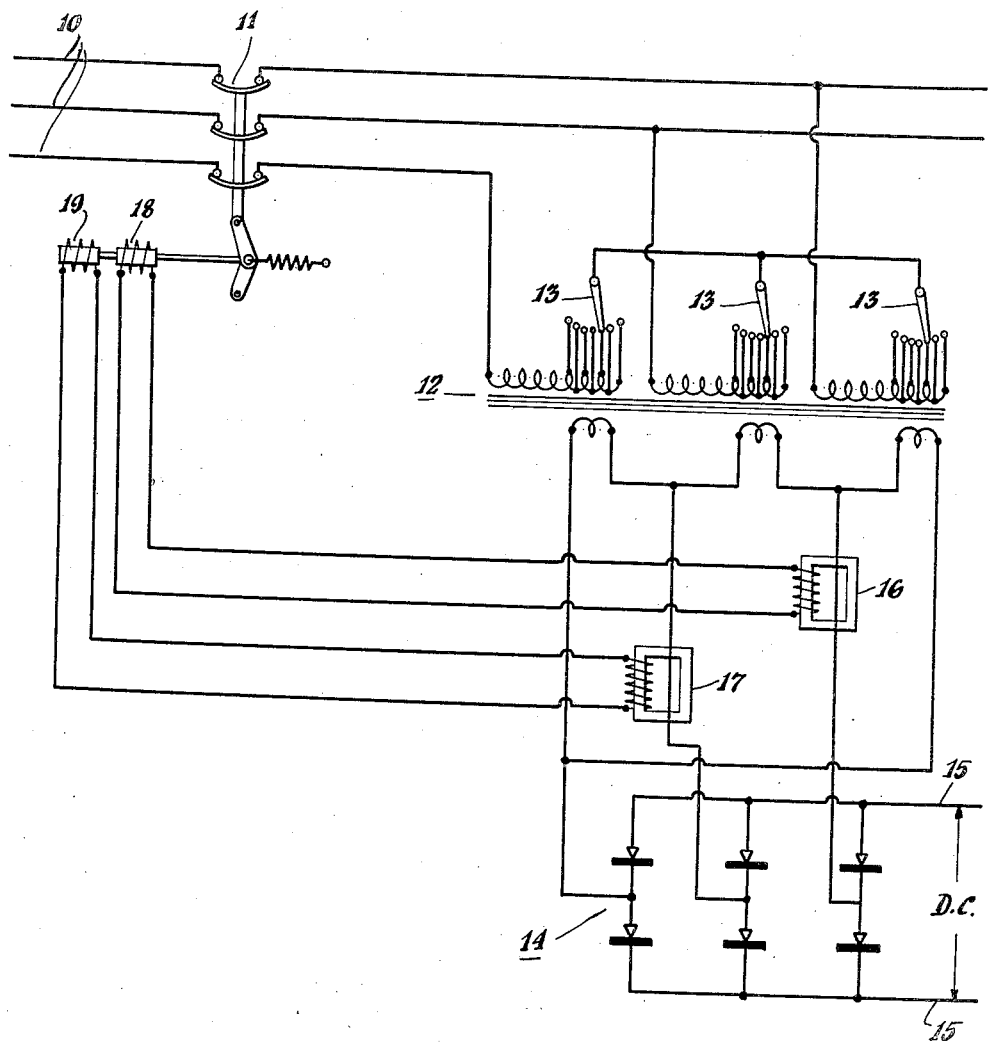

2,386,526

UNITED STATES PATENT OFFICE 2,386,526

PROTECTIVE CIRCUIT FOR TRANSFORMER-RECTIFIER SYSTEMS

Robert O. Whitesell and Paul B. Freeman, Indianapolis, Ind., assignors to P. R. Mallory & Co., Inc., Indianapolis, Ind., a corporation of Delaware Application September 9, 1943, Serial No. 501,602

2 Claims. (Cl. 175—363)

This invention relates to protective circuits for transformer-rectifier systems.

An object of the invention is to improve protective circuits for transformer-rectifier systems using tapped transformers.

Other objects of the invention will be apparent from the description and claims.

In the drawing the figure shows a transformer-rectifier system embodying features of the invention.

In power supply systems using dry disc rectifiers, such as magnesium-cupric sulfide rectifiers, selenium rectifiers, copper oxide rectifiers and the like it is necessary to protect the rectifiers against excessive currents which will damage the rectifying junctions or develop excessive heat which will do the damage. Heretofore thermostatic devices have been used for breaking the power supply circuit when the rectifiers approach dangerously high temperatures. The thermostatic devices have the disadvantage of slow operation, so that they do not protect the rectifiers from sudden overloads of current. Where tapped transformers are used it is desirable to use a circuit breaker in the input line to protect both the transformer and rectifier against abnormal current conditions.

Thermal and magnetic type circuit releases have also been used in the primary circuits of transformers where the current ratio remains practically constant.

On thermostatic devices in rectifier assemblies the heat rise will not be in proportion to current because back leakage (reverse current losses) vary with input voltage.

However, if the tap positions are changed on the transformer to change the D. C. output voltage then current ratio from the primary to the secondary will also vary. Hence, a current overload device in the primary circuit will not properly protect the rectifier for all transformer settings.

The present invention embodies a fast operating circuit controlled by the alternating current between the transformer secondary and the rectifier to interrupt the power supply to the transformer primary.

The drawing is a diagram of a protective circuit applied to a transformer-rectifier system suitable for supplying D. C. for electric plating, welding, charging or other operations from a 3-phase A. C. supply 10. Tapped transformer 12 is supplied from circuit 10 through circuit breaker 11. The transformer has its three primary windings tapped so that the transformer ratio can be varied by adjusting switch contacts 13.

A 3-phase full-wave rectifier 14 is fed from the secondaries of transformer 12 and supplies D. C. at its output terminals 15.

A pair of current transformers 16 and 17 are located in two of the conductors leading from the transformer to the rectifier. The output of these current transformers is supplied to windings 18 and 19 respectively which control the release of circuit breaker 11.

Circuit breaker 11 is preferably of the thermal overload type with a manual reset mechanism. When the current through current transformer 16 or 17 exceeds the safe operating level for rectifier 14 the current supplied to winding 18 or 19 will melt a solder link which will trip the release mechanism for the circuit breaker and open the power supply circuit 10.

It is contemplated that the circuit breaker may be of other known types such as magnetically tripped devices.

By the present invention the rectifier and transformer are always protected for the same current overload value regardless of the transformer setting.

While specific embodiments of the invention have been described, it is intended to cover the invention broadly within the spirit and scope of the appended claims.

What is claimed is:

1. In a transformer-rectifier system of the type wherein an A. C. supply circuit feeds an adjustable ratio tapped transformer through a circuit breaker and the transformer feeds a full-wave dry disc rectifier through A. C. secondary circuit conductors and said rectifier supplies D. C. to a pair of output conductors, the combination with at least one of said secondary circuit conductors of a current transformer having its output connected to the tripping coil of said circuit breaker.

2. A transformer-rectifier system wherein an A. C. supply circuit feeds an adjustable ratio tapped transformer through a circuit breaker and the transformer feeds a full-wave dry disc rectifier through A. C. secondary circuit conductors and said rectifier supplies D. C. to a pair of output conductors, characterized by the fact that there is combined with at least one of said secondary circuit conductors a current transformer having its output connected to the tripping coil of said circuit breaker.

ROBERT O. WHITESELL.
PAUL B. FREEMAN.